Aug. 13, 1957  E. S. TUPPER  2,802,499
ADAPTER COVER
Filed Nov. 17, 1954  2 Sheets-Sheet 2
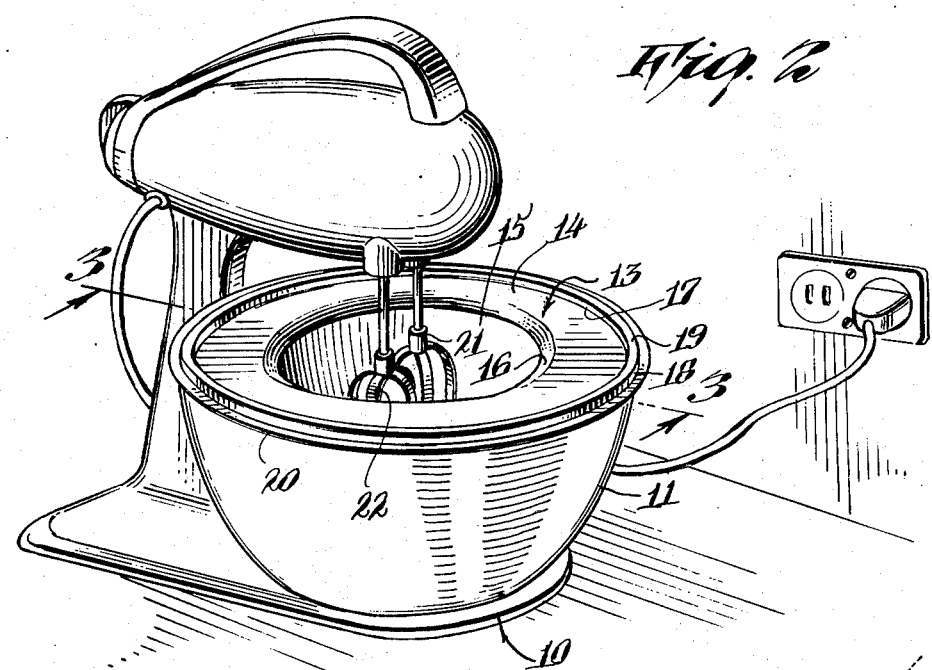
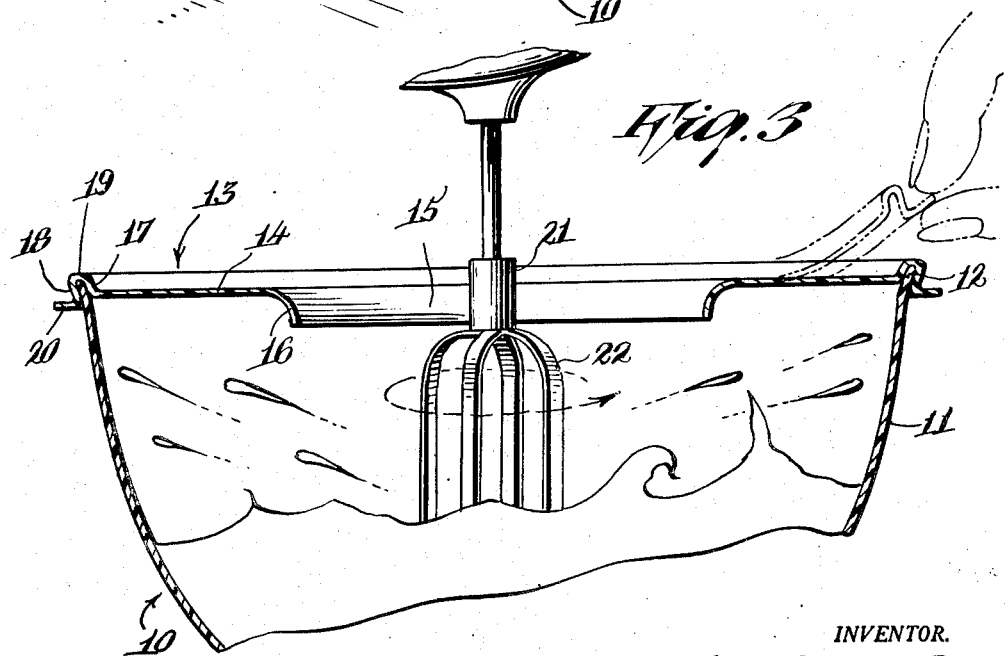
INVENTOR.
EARL S. TUPPER
BY
ATTORNEY

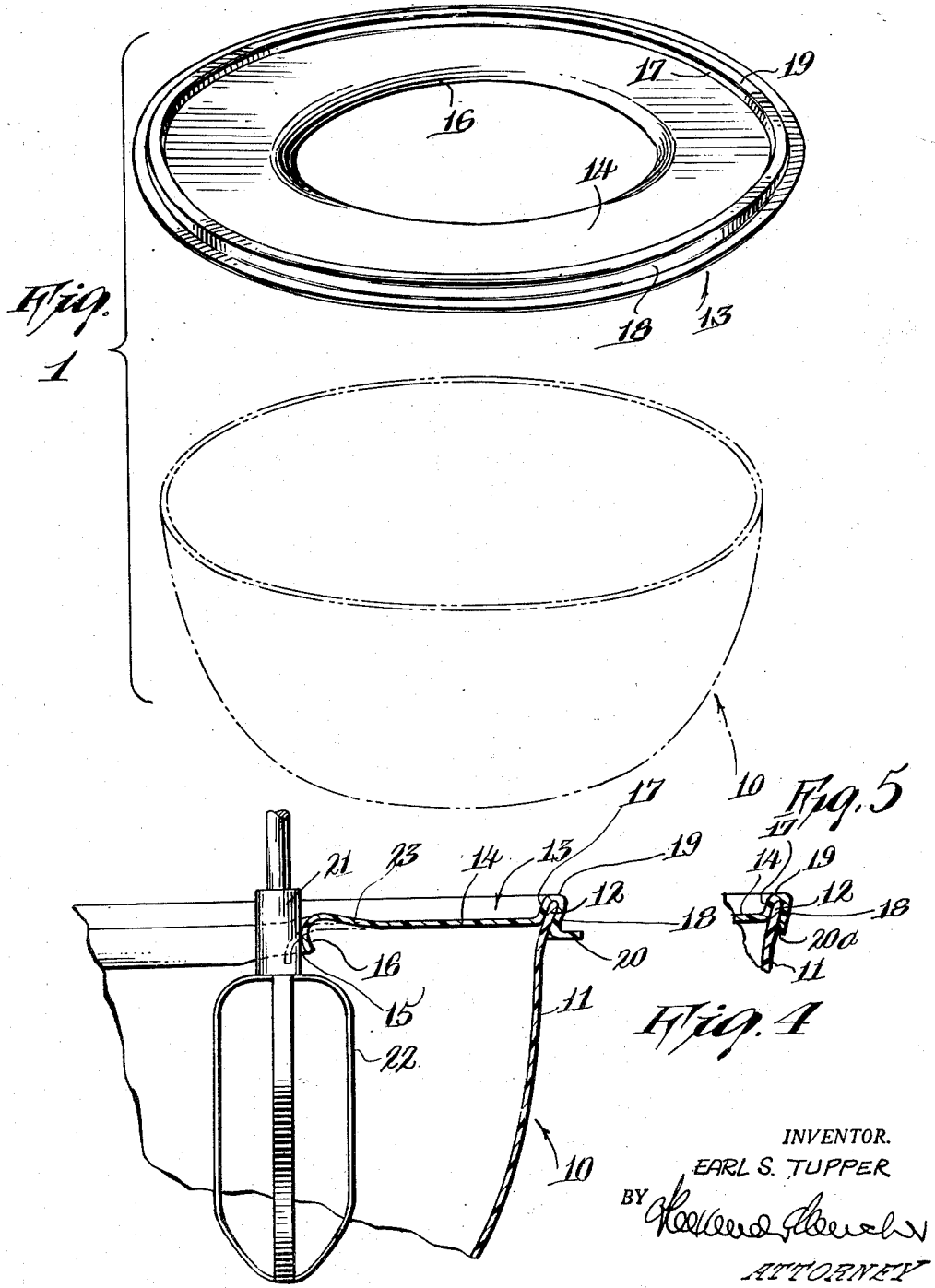

United States Patent Office 2,802,499
Patented Aug. 13, 1957

2,802,499

ADAPTER COVER

Earl S. Tupper, Upton, Mass.

Application November 17, 1954, Serial No. 469,524

2 Claims. (Cl. 150—.5)

This invention relates generally to adapter plates, but more specifically to a removable and apertured closure for a container such as a mixing bowl for selectively controlling the mouth dimensions of the container.

A feature of the invention resides in both the structure of a normally rigid adapter plate and its combination with a substantially rigid mixing bowl capable of use in connection with electrical mixers, beaters and hand devices, said plate and bowl at the same time being resiliently yieldable to shock of impact and prolonged local pressures whereby neither the electrical apparatus, beater, hand device, plate nor bowl is adversely affected.

A further feature of the invention resides in the provision of an adapter plate capable of use in connection with all types of containers and receptacles and made of any required material so that said plate is not only capable of removable and fluid-tight engagement with such containers at the rim but is also provided with a central, concentric opening capable for reducing the diametric mouth or lateral dimension of the container for any required purpose.

Another feature of the invention resides in the provision of a closure per se which is substantially shape retaining, which is sanitary, which is seal-proof in its application to the rim of a container, which is washable, which is inert to and resistant to chemicals and which at the same time is locally distortable, yieldable at points of sustained or sudden pressure and impact, and resilient with a slow rate of recovery at such points when the said external forces are removed.

The present invention constitutes an improvement over United States Patent Number 2,487,400 granted to the applicant herein on November 8, 1949.

A further feature of the invention resides in the provision of an adapter plate applicable to any type of container serving to reduce the mouth exposure thereof in a removable and seal-tight manner in instances wherein a partial top wall is essential for operation such as for evaporation, and mixing; and in instances where the same capacity container is capable of serving functions requiring differentially sized openings.

Another feature of the invention resides in the provision of a closure in conjunction with a container which serves as a removable and seal-tight concentric seal therefore beyond a central and concentric aperture and wherein said aperture is provided with a cylindrical form of edge to serve as a smooth substitute container rim.

A further object of the invention resides in the provision of an adapter plate which is simple to operate, durable, sanitary and efficient in operation.

These objects and other incidental ends and advantages of the invention will hereinafter appear in the progress of the disclosure and as pointed out in the appended claims.

Accompanying this specification are drawings showing a preferred form of the invention wherein:

Figure 1 is an exploded view in perspective of the adapter plate per se and disposed in spaced relationship above and in alignment with a container member shown in phantom.

Figure 2 is a view in perspective showing the adapter plate applied to a container and being used as a mixing bowl in cooperation with an electrically-driven mixer.

Figure 3 is an enlarged sectional view of Figure 2 across the plane 3—3 thereof.

Figure 4 is a partial sectional view showing the yieldability of the adapter plate wall adjacent the aperture in yielded condition on impact with the electrically-driven device.

Figure 5 is a partial sectional view of a modified form of the plate groove.

In accordance with the invention and the preferred form shown in the drawing, a vessel or container is generally indicated by numeral 10, and is of conventional shape such as a bowl, the peripheral side wall of which is indicated by numeral 11. The mouth of container 10 is provided with a rim 12, outwardly flared as shown and forms a continuation of the upper part of wall 11.

Although vessel 10 may be formed of any material for service with the adapter plate, such as metal, porcelain, glass, composition or the like in industrial, commercial and household use, for specific purposes, the vessel is preferably formed of polyethylene, or other substance having similar physical characteristics and including the vinyl compounds.

In conjunction with the adapter plate, any type of vessel or container such as 10 for illustration is capable of having a variable mouth opening by the use of a plurality of adapter plates each having a fixed outer lateral dimension corresponding with the rim dimension of the container, and each having a differently dimensioned central and concentric aperture. Only a single adapter plate, however, is shown herein.

The adapter plate shown is generally designated by numeral 13 and is preferably formed of polyethylene or other substance having similar physical characteristics and including the vinyl compounds. Plate 13 has a top wall 14 provided with a central and concentric aperture 15, said aperture at its edge curving downwardly and forming a peripheral flange 16 in the contour of a substantially cylindrical section. Such an aperture edge is smooth and lends itself to an ideal type of opening for a container either for purposes of filling or removing any type of contents.

At the outer edge of top wall 14 is a raised and inverted groove having an inner wall 17, a spaced outer wall 18, a top connecting wall 19 and a finger engageable offset, as shown being in the form of a flange 20 extending outwardly from the lower end of wall 18. Flange 20, however, may be in the form of a flared wall portion on the inner surface of groove wall 18 as shown in Figure 5 at 20a.

The groove defined by walls 17, 18 and 19 is adapted to engage the rim portion 12 of vessel 10 whereby a hermetical sealing engagement is effectuated. Preferable sealing points are between the top and outer surface of rim 12 and the corresponding inner faces of the groove top wall 19 and side wall 18. For this type of hermetical sealing, it is to be observed that the lateral dimension of the inner face of groove side wall 18 is less than the lateral dimension of the outer wall surface of container rim 12. Moreover, when both adapter plate 13 and container 10 are formed of the same locally deformable material, such sealing points are alive. Where container 10 is formed of a hard material, then hermetical sealing is accomplished by virtue of the inherent characteristics of the material from which plate 13 is formed.

The efficiency of adapter plate 13 on container rim 12 is due to the plate material and structural factors. Thus, for the application of plate 13 to container 10, said plate at the inverted groove is placed over the top edge of rim 12 and the top groove defining wall 19 is pressed downwardly by the thumb successively at adjacent points or slidably along the top groove defining wall axis to effect a spreading of the side groove walls 17 and 18 and a compression and expansion of plate wall 14 so that sealing engagement at least between rim 12 at the outer surface and the top thereof is effected with the corresponding inner faces of the side and top groove defining walls 18 and 19. Such operation for application of the closure 10 for liquid-tight and live sealability of the container allows an interfitting groove width which is either slightly less than the thickness of the rim wall or allows an outside lateral dimension or diameter of the rim of the container which is slightly larger than the lateral dimension or diameter of the inside wall of groove outer defining wall 18 as has been mentioned.

For the removal of the adapter plate 13 from container 10 and as shown in Figure 3, the flaring portion 20 or 20a is grasped between the thumb and a finger and easily and expeditiously peeled off from the rim 12 of the container in a silent and non-snapping manner. The plate has a triple type of action during initial removal. First the flaring portion 20 or 20a yields radially about the connecting or top groove defining wall 19 for local separation from rim 12 of the outer groove defining wall 18 by the upward thrust of the thumb. Then all the groove walls locally yield upwardly thereby becoming locally free of container rim 12, such second movement taking place by a local flexing of horizontal wall 14. Thereafter, the whole closure is removed by a peeling-off, silent and non-snap type of operation.

It is to be noted that the reason for having a liquid-tight seal for rim 12 is to prevent leakage or splashing through the rim portion of the container when the contents are subject to a beating, heating, evaporating or other type of operation.

Aperature or opening 15 in plate 13, as has been mentioned, serves as a reducer for the container mouth; so that a container of any fixed mouth dimension is capable of being used where requirements demand a smaller mouth dimension. Thus, an economy is effected by using an available container of fixed dimensions. Aperture flange 16, moreover, is smooth to reduce friction in the event that the implement used for the contents of the container comes in contact therewith accidentally or on purpose. As shown in Figure 4, engagement between the driving spindle lug 21 for beater 22 is shown, and resilient and local yieldability of the adapter wall 14 adjacent flange 16 is indicated by numeral 23. In this manner, by sudden or sustained impact, shock or pressure neither the implement, container nor adapter is subject to breakage. Moreover, shocks and vibrations are absorbed.

The plate generally indicated by numeral 13 as heretofore stated may come in sets wherein the lateral dimension of the groove edge is fixed and wherein the lateral dimension of the central and concentric aperture 16 is graded so that a single container of specific capacity may be used for different purposes and for several capacities. In effect adapter plate 13 serves as a continuous and fluid-tight top wall for container 10 provided with a central opening of selective dimension.

The adapter may be molded in conventional manner of polyethylene or other material having similar physical characteristics, and is odorless, electrically non-conducting, resistant to acids, alkalis, solvents and other chemicals at ordinary temperatures, will not soften far below the boiling point of water, is resistant to mildews, microorganisms and insects, has flexibility and elasticity with a slow rate of recovery, does not absorb and is not readily wetted by water, and is sanitary in use.

From Figure 3, it is to be observed that cover plate 13 prevents fluid under the process of beating such as cream or eggs from splashing over the top of bowl 10 adjacent rim 12, and furthermore, flange 16 acts as a baffle to prevent splashing through the area adjacent aperture 15.

I wish it understood that minor changes and variations in the material, method of molding, shape, integration, position and integration of parts may all be resorted to without departing from the spirit of the invention and the scope of the appended claims.

I claim:

1. An adapter plate for the rim of containers comprising a closure member of yieldable and resilient material and having a top wall provided with a central and concentric aperture to form an opening, raised and peripheral engaging means for removable engagement with the rim of a container and forming the outer edge of said top wall and having an inner wall, a spaced outer wall and a top connecting wall to form an inverted groove, said outer wall having an offset portion for finger engagement to remove said closure member from the rim, said top wall terminating in a rounded and downwardly extending flange bounding the edge of said opening, said flange being yieldable.

2. An adapter plate for the rim of containers of resilient and yieldable material comprising a closure member having a top wall provided with a central and concentric aperture to form an opening, raised and peripheral engaging means for removable engagement with the rim of a container and forming the outer edge of said top wall and having an inner wall, a spaced outer wall and a top connecting wall to form an inverted groove, said top wall terminating in a downwardly and curved flange bounding the edge of said opening, said flange being yieldable, said closure member being formed of resilient and yieldable material.

References Cited in the file of this patent

UNITED STATES PATENTS

| | | |
|---|---|---|
| 1,156,319 | Schaub | Oct. 12, 1915 |
| 1,706,335 | Toch | Mar. 19, 1929 |
| 2,048,695 | Hasenour | July 28, 1936 |
| 2,487,400 | Tupper | Nov. 8, 1949 |
| 2,606,586 | Hill | Aug. 12, 1952 |
| 2,614,727 | Robinson | Oct. 21, 1952 |
| 2,695,645 | Tupper | Nov. 30, 1954 |
| 2,695,732 | Tupper | Nov. 30, 1954 |
| 2,740,444 | Martinelli | Apr. 3, 1956 |